United States Patent
Brombach (12)

(10) Patent No.: US 11,697,354 B2
(45) Date of Patent: Jul. 11, 2023

(54) CHARGING STATION WITH CONTROL DEVICE AND METHOD FOR CHARGING ELECTRIC VEHICLES

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 107 days.

(21) Appl. No.: 17/048,014

(22) PCT Filed: Apr. 12, 2019

(86) PCT No.: PCT/EP2019/059418
§ 371 (c)(1),
(2) Date: Oct. 15, 2020

(87) PCT Pub. No.: WO2019/201771
PCT Pub. Date: Oct. 24, 2019

(65) Prior Publication Data
US 2021/0170901 A1    Jun. 10, 2021

(30) Foreign Application Priority Data

Apr. 17, 2018 (DE) .................... 10 2018 109 077.3

(51) Int. Cl.
*B60L 53/63* (2019.01)
*B60L 53/68* (2019.01)
*B60L 55/00* (2019.01)

(52) U.S. Cl.
CPC .............. *B60L 53/63* (2019.02); *B60L 53/68* (2019.02); *B60L 55/00* (2019.02)

(58) Field of Classification Search
CPC ........... B60L 53/63; B60L 53/68; B60L 55/00
(Continued)

(56) References Cited

U.S. PATENT DOCUMENTS

2007/0118255 A1    5/2007  Wakashiro et al.
2007/0282495 A1*  12/2007  Kempton ................ B60L 53/11
                                                             701/22
(Continued)

FOREIGN PATENT DOCUMENTS

CN          104253444 A      12/2014
CN          107069753 A       8/2017
(Continued)

OTHER PUBLICATIONS

Jin et al., "Hierarchical microgrid energy management in an office building", Applied Energy 208, Oct. 14, 2017, pp. 480-494.
(Continued)

*Primary Examiner* — Nathaniel R Pelton
(74) *Attorney, Agent, or Firm* — Seed Intellectual Property Law Group LLP

(57) ABSTRACT

A charging station for charging electric vehicles and the charging station comprises a network connection point for exchanging electrical power with an electrical supply network, at least one charging terminal, in each case for charging an electric vehicle, and a control device for controlling the charging station, wherein the control device is set up to determine an equivalent storage capacity and to transmit it to a receiver outside the charging station, in particular to an operator of the electrical supply network, a network controller and/or a direct marketer, wherein the equivalent storage capacity describes a value which corresponds to a storage capacity of an equivalent electrical storage device which can absorb or emit as much energy as the charging station can absorb or emit by changing its absorbed or emitted power for a predetermined support period.

20 Claims, 1 Drawing Sheet

(58) Field of Classification Search
USPC .......................................................... 320/109
See application file for complete search history.

(56) References Cited

U.S. PATENT DOCUMENTS

| | | | |
|---|---|---|---|
| 2013/0229149 A1* | 9/2013 | Sortomme | H02J 7/00 320/109 |
| 2013/0335025 A1 | 12/2013 | Kuribayashi et al. | |
| 2013/0335032 A1 | 12/2013 | Kuribayashi et al. | |
| 2014/0139188 A1 | 5/2014 | Yonezawa et al. | |
| 2016/0164329 A1 | 6/2016 | Hashimoto et al. | |
| 2016/0167539 A1* | 6/2016 | Huang | B60L 58/12 320/109 |
| 2021/0114478 A1 | 4/2021 | Brombach | |

FOREIGN PATENT DOCUMENTS

| | | |
|---|---|---|
| WO | 2016/120240 A1 | 8/2016 |
| WO | 2019/201781 A1 | 10/2019 |

OTHER PUBLICATIONS

Musio et al., "A Virtual Power Plant Management Model Based on Electric Vehicle Charging Infrastructure Distribution", 2012 $3^{rd}$ IEEE PES Innovative Smart Grid Technologies Europe (ISGT Europe), Berlin, pp. 1-7.
Palensky et al., "Demand Side Management: Demand Response, Intelligent Energy Systems, and Smart Loads", IEEE Transactions on Industrial Informatics, vol. 7, No. 3, Aug. 2011, pp. 381-388.

* cited by examiner

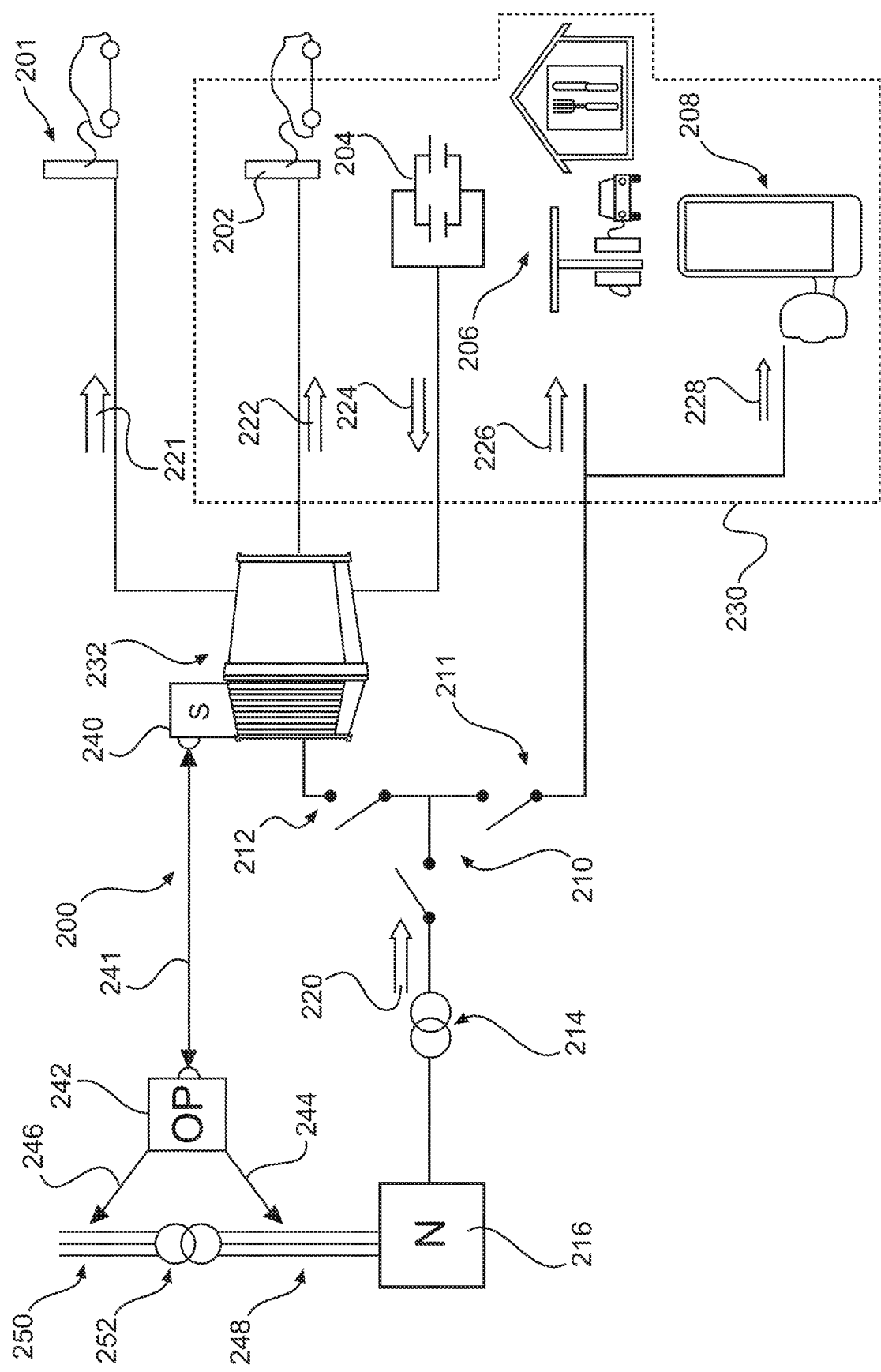

CHARGING STATION WITH CONTROL DEVICE AND METHOD FOR CHARGING ELECTRIC VEHICLES

BACKGROUND

Technical Field

The present invention relates to a charging station for charging electric vehicles. The present invention also relates to a method for charging electric vehicles by means of a charging station.

Description of the Related Art

Charging stations are known and are used to charge a plurality of electric vehicles. In particular, this involves charging stations which can charge many electric vehicles in a parallel manner, i.e., at the same time or at least in a temporally overlapping manner, such as 10 or more electric vehicles, for example. Charging stations of this type correspondingly require a lot of power and can therefore have their own network connection point, via which they are connected to an electrical supply network in order to obtain this power therefrom.

Owing in particular to the increasing demand for ways to charge electric vehicles, the power requirement for charging stations of this type is also increasing. The network connection point of the respective charging station and the section of the electric supply network connected thereto must correspondingly also be designed to provide appropriate power.

However, limits can be quickly reached in this case, which affect the network connection point, in particular the relevant section of the electrical supply network. In order to still be able to transmit sufficient or even more power, the corresponding network connection point or the relevant section of the electrical supply network would have to be appropriately designed or possibly upgraded, which can frequently result in costly construction work.

Correspondingly, the power efficiency and thus the size of a charging station of this type can be limited to an undesirably low value if costly construction work of this type is to be avoided.

If the electrical supply network is not modified, the additional installation of more efficient charging stations can cause a heavy load or can even weaken the electrical supply network.

In the priority application for the present PCT application, the German Patent and Trademark Office has researched the following prior art: US 2013/0229149 A1; US 2014/0139188 A1; WO 2016/120240 A1; "A virtual power plant management model based on electric vehicle charging infrastructure distribution"; M. Musio et al., "Demand Side Management: Demand Response, Intelligent Energy Systems, and Smart Loads", P. Palensky et al.; "Hierarchical microgrid energy management in an office building", Xiaolong Jin et al.

BRIEF SUMMARY

Provided are techniques for providing a charging station which is as efficient as possible while at the same time causing as little weakening to the electrical supply network as possible. It would even be particularly preferable to support the electrical supply network. An alternative solution to the known solutions should at least be proposed.

A charging station of this type is provided for charging electric vehicles. In particular, it can charge a plurality of electric vehicles, in particular 10 or more electric vehicles, at the same time or at least in a temporally overlapping manner.

In order to obtain the electrical power which is required for this purpose, the charging station comprises a network connection point for exchanging electrical power with an electrical supply network. Electrical power is thus obtained via this network connection point, but it is also possible to feed electrical power into the electrical supply network via this, such that here it is generally a question of exchanging electrical power.

Furthermore, at least one charging terminal is provided for charging an electric vehicle. A charging terminal of this type, a plurality of which are preferably present, can particularly be designed as a charging column. A charging terminal of this type is then provided for directly charging at least one electric vehicle. Speaking descriptively, a charging terminal of this type has at least one charging cable via which the charging terminal is connected to an electric vehicle which is to be charged, in order to then charge the electric vehicle via this charging cable.

A control device for controlling the charging station is also provided. A control device of this type is particularly provided for the overall control of the charging station, as will be explained hereinafter. In each case, the specific charging of an individual electric vehicle by way of the relevant charging terminal can also be controlled by the control device, but it can also be controlled locally by the respective charging terminal. The charging terminal optionally receives command values or set values from the control device for this purpose.

The control device is particularly set up to determine an equivalent storage capacity. An equivalent storage capacity of this type describes a value which corresponds to a storage capacity of an equivalent electrical storage device which can absorb or emit as much energy as the charging station can absorb or emit by changing its absorbed or emitted power for a predetermined support period. The equivalent storage capacity therefore describes an energy value which can be emitted over a predetermined support period.

The control device is also set up to transmit the determined equivalent storage capacity to a receiver outside the charging station. Provision is preferably made for the charging station, in particular the control device, to have a transmission interface for transmitting the equivalent storage capacity to a receiver outside the charging station, in particular a data terminal, a cable connection to the receiver, or a transmitting and receiving unit for operating a wireless connection to the receiver. The control device or a different element of the charging station can therefore have or produce a corresponding data terminal, or a corresponding cable connection to the receiver, or a wireless connection to the receiver. The control device and therefore the charging station thus determines the equivalent storage capacity and transmits this value to an external receiver. An external receiver of this type is in particular an operator of the electrical supply network, i.e., a network operator or even a control system which controls the network area of a network operator and can also be described as a secondary controller or network controller. A control system which directly records network sizes, in particular a frequency, is also conceivable and can be described as a primary controller.

The equivalent storage capacity could also be made available to an electricity marketer who uses the equivalent storage capacity for managing their balancing group. They could be provided with the information via a transmission interface, for example, such that the transmission interface is made available to them.

This makes it possible for the external receiver, i.e., particularly the network operator, to be able to better assess the potential for power adjustment of the charging station. A substantially constant power flow from the electrical supply network to the charging station via the network connection point should indeed be consistently available, which can also vary, of course, but the manner in which this power flow can be altered is not consistently known to the network operator. However, this specification of the equivalent storage capacity provides them with information which can help them when planning the power or energy distribution.

If the charging station reports via its control device, for example, that it has an equivalent storage capacity of 10 kWh over a specific support period of 5 minutes, for example, the network operator knows that they can correspondingly reduce the power supply to this charging station, if required, for this support period of 5 minutes, mentioned by way of example, without the charging station losing functionality as a result. The charging station can therefore continue charging electric vehicles which are being charged at that moment in the same way, despite a short-term power reduction of this type. In the example mentioned, a power reduction of up to 150 kW could therefore take place for the 5 minutes. The network operator could correspondingly use this power for necessary support tasks, such as compensating a short-term increase in power demand, for example. There may be a large amount of support power available for the network operator particularly if many charging stations have such a functionality.

By specifying an equivalent storage capacity, the network operator, or also a direct marketer or network controller or secondary controller can be provided with a value which can be easily planned and which additionally makes better energy planning possible over the support period than when specifying an instantaneous power value.

According to an embodiment, it is proposed that the control device is set up to determine the equivalent storage capacity at least depending on a charging situation of the at least one charging terminal and optionally also depending on a current storage capacity of at least one electrical storage device of the charging station, if applicable, and/or depending on an operating point of the at least one further controllable consumer.

The charging situation of at least one charging terminal particularly describes how much power is being used to charge at the charging terminal at that moment. This preferably includes to what extent this charging process can also be reduced or even stopped or interrupted.

If an electric vehicle is currently being charged with 10 kW, for example, and it is known that this charging power can also be reduced to 5 kW, for example, this is information regarding the charging situation. In this example, 5 kW could therefore be activated. If four further charging terminals have a similar charging situation, for example, 25 kW could be activated. The charging power applied at that moment would therefore be able to be reduced by 25 kW, so that this 25 kW would additionally be available. If this 25 kW were to be available over a period of 6 minutes, to take an easily calculable example, this could be interpreted as an equivalent storage capacity of 2.5 kWh. As long as no further values are added, an equivalent storage capacity of 2.5 kWh would thus have been determined for the exemplary support period of 6 minutes.

The charging power can also be divided into a fixed and a variable part via the charging process, wherein the values can be variable over the charging process. If a very empty vehicle is charged, for example, there is firstly a need to charge it quickly. If a higher charging state is reached, a greater part of the charging power can be variable without greater disadvantages arising for the vehicle which is to be charged.

An electrical storage device can also optionally be provided in the charging station, which storage device can also be designed as an electrical precharged storage device. An electrical storage device of this type likewise has a current storage capacity in each case, i.e., how much energy is stored in it and can be accessed. This actual current storage capacity can then possibly also be taken into account when determining the equivalent storage capacity.

Additionally or alternatively, it is proposed that the operating point of a further controllable consumer is also taken into account in order to determine the equivalent storage capacity. A controllable consumer of this type can be a thermal storage device, for example, including also a cold store, which indeed requires a certain power for its functionality but which can be increased or reduced at short notice, which can be compensated particularly by its mode of operation, namely particularly the thermal capacity. A consumer of this type also has an operating point which specifies how much electrical power is being consumed at that moment. In addition, the information regarding whether and to what extent this operating point can be changed, i.e., in particular to what extent the power being used at that moment can be reduced, can be used particularly for this purpose. Correspondingly, a power in the amount of this reduceable power can be activated for the charging station. This can also contribute to determining the equivalent storage capacity.

According to an embodiment, it is proposed that a positive equivalent storage capacity and/or a negative equivalent storage capacity can be determined and transmitted as an equivalent storage capacity. In this case, the positive equivalent storage capacity specifies how much energy can additionally be fed into the electrical supply network or by how much energy a withdrawal from the electrical supply network can be reduced. In each case, this is thus the energy which the electrical supply network can additionally have available compared to the current state. The electrical supply network or its network operator therefore additionally has this amount of energy available in order to tackle a short-term increase in the power demand in the electrical supply network.

Correspondingly, the negative equivalent storage capacity specifies how much energy can additionally be absorbed from the electrical supply network or by how much energy a feed-in to the electrical supply network can be reduced. Correspondingly, this is an amount of energy which the electrical supply network or its network operator can fall back on if there is an excess supply of power at short notice.

In each case, it is also important to note that taking into account the equivalent storage capacity, be it positive or negative, is also based on the idea that this is storable energy which is not consumed less or additionally, but instead is merely consumed at another point in time. This energy can therefore be used as an energy buffer or it can be used in this manner. In particular, it can represent a kind of momentary reserve or minute reserve.

According to a configuration, it is proposed that a current charging power, but with which one or a plurality of electric vehicles is charged, is divided into a minimum charging power, an available charging power and optionally an additional charging power, for determining the equivalent storage capacity. The minimum charging power specifies a charging power which the current charging power should not fall below. However, if the charging power can thus be reduced, this should not be to zero, but rather it should at least continue to be charged with this minimum charging power. As far as possible, it should not fall below this.

The available charging power is that charging power by which the current charging power can be reduced. Correspondingly, the current charging power is made up of the total of the minimum charging power and the available charging power.

If an additional charging power is optionally also taken into account, this is the one by which the current charging power can be increased. This is therefore based on the idea that in this case the relevant electric vehicles are not being charged at maximum speed, i.e., not with the theoretical maximum charging power, but rather that there is still potential to increase the charging power, namely an increase by the additional charging power.

It is proposed that the positive equivalent storage capacity is determined depending on the minimum charging power. Starting from the current operating point, a power can thus be activated by reducing this charging power to the minimum charging power. This would then also correspond to the available charging power by which the current power can be reduced.

Additionally or alternatively, it is proposed that the negative equivalent storage capacity is determined depending on the additional charging power. The charging power can thus be increased by the additional charging power and, correspondingly, more power can be withdrawn from the electrical supply network. The value for this can be determined via the negative equivalent storage capacity.

It is preferably proposed that the control device is set up to receive a specification of an equivalent storage capacity externally, particularly from a network operator, and to control the charging station in such a way that the predetermined equivalent storage capacity is reached, or to output information regarding which equivalent storage capacity can be provided instead if the one which is predetermined cannot be fully reached. The charging station is thus set up to not only offer an equivalent storage capacity, but rather to possibly also provide or absorb corresponding energy. For this purpose, the control device can control particularly the charging terminal, additional consumers and/or the electrical storage device in such a way that this energy can be provided or absorbed.

According to an embodiment, it is proposed that a period of a momentary reserve, a period of a primary control, a period of a secondary control, a period of positive or negative minute reserve or a period of balancing group management is taken as a basis for a predetermined support period. Regulations and regulatory effects of this type of the momentary reserve, primary control, minute reserve or secondary control are known in principle and also their times. It has been particularly recognized here that, depending on the determination of the support period, a corresponding regulation or a corresponding regulatory effect can be provided by the charging station. In this case, the period of a momentary reserve is in particular a period of up to 10 seconds. The period of a primary control in particular ranges from 10 to 30 seconds. A period of a secondary control in particular ranges from 30 seconds to 5 minutes. A period of a positive or negative minute reserve in particular ranges from 5 minutes to 15 minutes. A period of balancing group management in particular ranges from 15 minutes to one hour.

According to a configuration, it is proposed that a charging power curve which is known, expected and/or forecasted is taken as a basis for determining the equivalent storage capacity. This is in particular based on the knowledge that most electric vehicles or their batteries have known charging characteristics. It is often the case that charging can be carried out with high power or with high currents at the start, their value decreasing as time passes. A characteristic of this type is usually independent or substantially independent of the respective charging terminal which is performing the charging. If a situation therefore occurs, for example, in which a great number of electric vehicles are currently beginning their charging process in the charging station, it is anticipated that this entire charging power will soon reduce. According to the aforementioned embodiment, precisely this is taken into account for determining the equivalent storage capacity and it can be made available to the network operator via the equivalent storage capacity.

According to an embodiment, it is proposed that an emergency storage capacity is determined which specifies an, according to the amount, increased, in particular maximum equivalent storage capacity which in particular relates to an equivalent storage capacity which arises if the minimum charging power is also taken into account as the charging power which is to be taken into account. In particular if a reduction of the charging power to zero is also taken into account for determining the equivalent storage capacity, or even a reduction to a negative value, in the case of which power is withdrawn from the at least one electric vehicle. An emergency storage capacity of this type can therefore be determined and can also be communicated to the external receiver, particularly the network operator. It is then clear to what extent a power can be maximally activated and that this should nevertheless be avoided under normal conditions. Under what circumstances and/or how often an emergency storage capacity of this type may be accessed can be regulated by contract, for example.

According to an embodiment, it is proposed that depending on the determined equivalent storage capacity, a support power is provided to the electrical supply network, in particular a momentary reserve, primary control, positive or negative minute reserve or a secondary control. This is in particular based on the idea that this equivalent storage capacity essentially specifies a storage capacity of a precharged storage device or a similar storage device, without this storage device or precharged storage device having to be present in its full size. This equivalent storage capacity can also change depending on many circumstances and ancillary conditions. However, the idea is to have available a storage capacity as if from an actual storage device and, depending on this, a support power can then be fed in or withdrawn. A support power can therefore be provided. Whether this is then actually accessed, i.e., whether the storage device on which the idea is based is actually discharged or charged, is not yet clear. The possibility is merely provided and this can already be very important for the network operator. In particular, they know what kind of performance they can anticipate.

In this case, it is not merely the equivalent storage capacity which is important, but also the dynamics with which, in particular within what response time, a corresponding support power can be provided depending on this. Since a charging station is consistently coupled to an electrical supply network by way of a semiconductor switch, reactions to demands can substantially be as quick as required. Correspondingly, the aforementioned regulation possibilities or phenomena can be provided, namely a momentary reserve, a primary control, a positive or negative minute reserve and/or a secondary control.

Even in the event that the charging station actually feeds power actively into the electrical supply network, this preferably also takes place through a feeding inverter, which can also be a bidirectional inverter. This can also react correspondingly fast. However, a slower reaction time can also be programmed, depending on requirements. A slower reaction time can particularly also have a stabilizing effect on the electrical supply network. This is particularly based on the knowledge that conventional power stations which actually use directly coupled synchronous generators will decline in dominance in the electrical supply network, while so-called decentralized suppliers, in particular wind turbines and photovoltaic cells, will increase. However, the number of charging stations will also increase and charging stations of this type can therefore advantageously also be incorporated into the regulation or stabilization of the electrical supply network. One advantageous aspect for the charging station is therefore also that it can be set to different control modes or can emulate them. Emulation is particularly envisaged by providing the aforementioned regulations.

According to a configuration, it is proposed that the control device is set up, in particular depending on the equivalent storage capacity, to control the charging of the at least one electric vehicle, to specify in each case at least one charge set value or an available charging power to the relevant charging terminals. This makes it possible to optionally activate the equivalent storage capacity. A central control preferably takes place by way of the control device, while the specific control of individual charging processes can be controlled by the charging terminals. However, for this purpose they can receive set values for a power which is to be fed in.

Additionally or alternatively, provision is made for the control device to control storing or withdrawing electrical power of the at least one electrical storage device, if one is present in the charging station. In particular, controlling a storage device of this type is particularly preferably carried out centrally by the control device. It can therefore also directly control the power withdrawal from the electrical supply network, optionally also a feed-in of electrical power from the electrical storage device.

Additionally or alternatively, the control device also exchanges electrical power via the network connection point, therefore controlling this process. It can carry this out particularly with knowledge regarding other information or other control steps. It can directly control the withdrawal of power from the electrical storage device and also directly control feeding electrical power into the electrical supply network, for example.

The control device is preferably also set up to control the driving of the at least one controllable consumer. The control device can thus reduce the power consumption of a controllable consumer, for example, by specifying a corresponding set value therein. However, the actual mode of operation of the controllable consumer with respect to its original purpose is preferably carried out by the controllable consumer itself, although taking into account a specification by the control device of the charging station. A specification of this type can be a maximum power which is to be absorbed for a certain period, for example.

All of these control processes can also be controlled, at least coordinated, centrally by the control device.

A method for controlling a charging station is also proposed. The method preferably works in such a way as has been described previously in relation to embodiments of the charging station. In particular, the method works in such a way as has been described in relation to the control device, wherein the fact that the control device does not necessarily have to be used also comes into consideration.

The method preferably uses a charging station as claimed in one of the embodiments described previously.

BRIEF DESCRIPTION OF THE SEVERAL VIEWS OF THE DRAWINGS

The invention is explained in greater detail hereinafter by way of example with reference to the accompanying FIGURE by means of an embodiment.

FIG. 1 shows a schematic charging station which is connected to an electrical supply network.

DETAILED DESCRIPTION

FIG. 1 thus shows a charging station 200 with a first and a second charging terminal 201, 202. The first and the second charging terminal 201, 202 are in principle also representative of further charging terminals. For the purpose of explanation, the first charging terminal 201 is designed as one which is also suitable for high charging power, in particular for fast charging power, while the second charging terminal 202 is a normal charging terminal. In principle, provision can be made for the second charging terminal 202 to also be designed like the first charging terminal 201 and in particular also has fast charging capability. Alternatively, each charging terminal can also be described as a charging point. This applies to the first and also to the second charging terminal 201, 202.

An actual electrical precharged storage device 204 is provided in the charging station 200 as a further optional element. This optional precharged storage device 204 can, particularly if required, provide additional power for charging electric vehicles. In particular, if additional charging power is required, the precharged storage device 204 can deliver it to at least one charging terminal, i.e., the first charging terminal 201 mentioned as an example and/or the second charging terminal 202. Provision is best made for this if there is a high demand for charging power at short notice at the one or particularly at a plurality of charging terminals 201, 202. It should be reiterated here that the two charging terminals 201, 202 can be representative of many charging terminals. For example, if 20 charging terminals are provided, there can be a high power demand particularly if many or all of these 20 charging terminals mentioned by way of example are being used. There can also be a high power demand for charging when one fast charge or many fast charges are being used.

The charging station 200 also has a rest stop, possibly with a conventional gas pump, i.e., a gas pump for refueling fossil fuel. This rest stop is identified here as a rest stop 206 and, in this case, forms a further consumer which can be at least partially controlled. The partial controllability refers to the fact that some elements are controllable, such as heating to heat the building, for example, others are not controllable, such as an elevator or kitchen appliances at the rest stop, for example.

Furthermore, a thermal storage device 208 is represented as a further consumer. This thermal storage device 208 can heat itself or a storage medium during a corresponding power input and can emit this heat if required, for example as hot air or as hot water. For example, a thermal storage device of this type can heat the storage medium, for example water, and hot water can then be withdrawn from the thermal storage device 208 if required, particularly in the upper region of a hot water tank. It is then usually reheated. However, if it is not initially reheated, despite hot water being withdrawn, this does not initially have any impact or any noticeable impact, since a hot water tank of this type is consistently initially replenished with cold water only in the bottom region, which is then heated. The replenished cold water does not reach the upper region at that moment, so that the hot water withdrawal is not influenced or is barely influenced, even if the refilled cold water is not immediately heated.

In order to supply the charging station 200, particularly the charging terminals 201 and 202, the optional precharged storage device 204, the rest stop 206 and the thermal storage device 208 which is representative of other or further loads, the charging station is connected to an electrical supply network 216 via a network connection point 210 and, for example, a transformer 214. A circuit breaker is indicated illustratively at the network connection point 210, which circuit breaker is of course closed during normal operation.

An individual consumer network connection point 211 can be provided for the rest stop 206 and the thermal storage device 208, which are both representative of further consumers, if a charging network connection point 212 is also provided for the charging terminals 201 and 202 and possibly the optional precharged storage device 204. The consumer network connection point 211 and the charging network connection point 212 are also equipped with a circuit breaker in an illustrative manner and these circuit breakers are also closed during normal operation and are only shown as being open here for the purpose of representation.

The network connection point 210 can be divided into the consumer network connection point 211 and the charging network connection point 212, as shown in FIG. 1, or the consumer network connection point 211 and the charging network connection point 212 are each actually independent network connection points, so that the network connection point 210 could be dispensed with. However, it is also possible that only the network connection point 210 is present and moreover the entire charging station is connected to the electrical supply network 216 without the consumer network connection point 211 and the charging network connection point 212.

In particular, it is possible to only use one network connection point, namely the network connection point 210, if the charging station, including the rest stop and further consumers such as the thermal storage device 208, are completely newly planned and constructed. Particularly if a rest stop is already present, optionally with further consumers, it is possible that it is connected to the electrical supply network 216 via a network connection point such as the consumer network connection point 211. If an infrastructure for charging electric vehicles is then added, i.e., in particular charging terminals such as the first and second charging terminal 201, 202, and optionally also the precharged storage device 204, an additional network connection point such as the charging network connection point 212 can thus be provided for this purpose.

During normal operation, the charging station 200 obtains a network power 220 from the electrical supply network 216, which network power is distributed over all of the consumers of the charging station 200, namely over the first charging terminal 201, the second charging terminal 202, the rest stop 206 and the thermal storage device 208. If the optional precharged storage device 204 is also present, it can also receive power from the network power 220, wherein this can also be a negative portion, i.e., if the precharged storage device does not store power but withdraws it. Correspondingly, power flows are indicated in FIG. 1 by means of arrows, namely a first charging power 221 which flows to the first charging terminal 201, a second charging power 222 which flows to the charging terminal 202, a first consumer power 226 which flows to the rest stop 206, and a second consumer power 228 which flows to the thermal consumer 208. A storage power 224 which the precharged storage device 204 emits is indicated for the optional precharged storage device 204.

The total of the first and second charging power 221, 222 and the first and second consumer power 226, 228, minus the storage power 224, thus corresponds to the network power 220.

If there is suddenly an increased demand of charging power at the first charging terminal 201, for example, because a corresponding vehicle is to be charged which is designed for very high charging power, for example, wherein this high charging power must also be retrieved, the first charging power 221 would have to be correspondingly increased. The network power 220 would then have to be increased by the same amount for this purpose. However, if the network power 220 is already at its maximum limit at that moment at which this increased charging request is made, it cannot be increased any more. The additionally required power of the first charging power 221 would therefore not be able to be delivered.

However, it has now been recognized that this additional power can nevertheless be provided if the remaining powers can actually be correspondingly adjusted. The second charging power 222 could therefore be reduced, the first consumer power 226 could be reduced, the second consumer power 228 could be reduced and/or the storage power 224 increased. For example, each of these four powers mentioned can make a small contribution which may be sufficient to provide the increased power demand of the first charging power 221. In this case, it is important to note that particularly a high fast charging power is often only required for a few minutes. This is usually caused by the charging characteristics of the corresponding battery which is to be charged in this case. This increased demand therefore regularly only consists of a few minutes.

In order to be able to firstly evaluate whether this increased demand of the first charging power 221 can even be provided for this short period, which is described as a predetermined charging period here, it is proposed that an equivalent storage capacity be determined. In this respect, this equivalent storage capacity specifies a storage capacity of a virtual precharged storage device. For illustrative purposes, the second charging terminal 202, the precharged storage device 204, the rest stop 206 and the thermal storage device 208 are summarized here as a virtual precharged storage device 230. The virtual precharged storage device 230 is particularly characterized in that it cannot actually store energy or can only partially store energy by way of the actual precharged storage device 204 and correspondingly absorb or emit power, but rather in that it can change a power flow. When the power of an actual storage device is emitted, the power absorbed by the virtual precharged storage device is reduced. In other words, the increased power demand of the first charging power 221 mentioned by way of example can be realized by the virtual precharged storage device 230 absorbing, i.e., consuming less of the corresponding power according to the increased power demand of the first charging power 221. It may of course also be the case that the virtual precharged storage device actually emits positive power, namely if the emitted storage power 224 of the actual precharged storage device 204 is correspondingly high. The power reduction of the precharged storage device consistently means, particularly if the precharged storage device 204 is not present, that power still continues to be absorbed and consumed by the elements of the virtual precharged storage device 230 even after the reduction, just less than before.

In order to be able to manage the power of this virtual precharged storage device 230, an equivalent storage capacity is determined. In principle, this only takes into account the potential by which the power consumption of the virtual precharged storage device 230 can be reduced and relates this to the predetermined charging period, i.e., the period for which there is the aforementioned increased power demand of the first charging power 221, for example.

Depending on the predetermined charging period, this equivalent storage capacity can then be determined from by how much power the second charging power 222 can be reduced, by how much the storage power 224 can be increased in the predetermined charging period, by how much the first consumer power 226 can be reduced in the predetermined charging period, and by how much the second consumer power 228 can be reduced in the predetermined charging period. In this case, it can of course also be taken into account that one or a plurality of these aforementioned powers cannot be constantly changed evenly over the predetermined charging period. In the end, the result is only one value for the equivalent storage capacity. Depending on this, to what extent the increased demand of the first charging power 221, mentioned by way of example, can be met can then be evaluated and correspondingly the first charging terminal 201 can be controlled.

All of these calculations of the equivalent storage capacity can be carried out by means of a control device 232 and this control device 232 is linked to the first and second charging terminal 201, 202 and the optional precharged storage device 204 here in a representative manner. This is to indicate that the control device 232 is provided particularly for these elements of the charging station 200. However, it has been particularly recognized that further consumers, such as the rest stop 206, mentioned by way of example, and the thermal storage device 208, also only mentioned by way of example, can also be included. The control device 232 preferably then also controls further consumers of this type, such as the rest stop 206 and the thermal storage device 208.

The control device 232 can also be provided for feeding electrical power into the electrical supply network 216 and in particular can control or have a bidirectional inverter for this purpose. Electrical power can therefore be withdrawn from and also fed into the electrical supply network 216 via a bidirectional inverter of this type. This is proposed for any embodiment. In particular, it is thus generally proposed that the charging station is coupled to the electrical supply network via a bidirectional inverter, in order to optionally withdraw electrical power from the electrical supply network and to feed electrical power into the electrical supply network. A bidirectional inverter of this type makes it possible, amongst other things, to also set up a reactive power when withdrawing electrical power and also when feeding in electrical power.

Insofar as only one network connection point 210 is present, the first charging power 221 can correspond to the maximum network power 220, possibly including the power which the precharged storage device 204 can emit, if it is present.

However, if this is based on a topology in which the two network connection points are present, such as the consumer network connection point 211 and the charging network connection point 212, the first charging power 221 is thus not limited to the power which the charging network connection point 212 can deliver, possibly including the storage power 224, but rather power can be added, at least partially, which is obtained via the consumer network connection point 211. The topology from FIG. 1, which is schematically shown, indeed does not show a connection of this type, but it can be present or be created.

In other words, particularly in the event that a rest stop, such as the rest stop 206, is expanded to include charging for electric vehicles, this expansion can be achieved via the thus newly created charging network connection point 212. In principle, this charging network connection point 212 would then limit a power limit for the maximum charging power, as long as no precharged storage device 204 is present. However, it has been recognized here that at least for short-term, high power demands which consistently only last in the range of a few minutes, at least a part of the power can be added which is obtained by the further consumers, i.e., particularly the rest stop 206.

All of this is planned and controlled particularly by the equivalent storage capacity in each case being determined for a predetermined charging period. This may also mean that the maximum power of the consumer network connection point 211 is not yet exhausted in the topology of the two network connection points, i.e., the charging network connection point 212 and the consumer network connection point 211.

It is thus proposed that an overall consideration of all of electrical elements should be taken into account when managing the charging power, at least to the extent that they can be controlled. This is preferably realized here by determining an equivalent storage capacity.

FIG. 1 additionally shows a transmission unit 240 for transmitting the determined equivalent storage capacity to a network operator 242 via a data channel 241 which can be designed to be wired or also as a transmission path. The network operator 242 can control their network, which is only indicated by the control arrows 244 and 246. In this case, as part of the overall symbolic electrical supply network 216, a distribution network 248 and a transmission network 250 is indicated in an illustrative manner which are represented as being symbolically coupled by a high-voltage transformer 252. In contrast to the symbolic representation, the supply network 216 can be considered to be the generic term for the distribution network 248 and the transmission network 250 or for a group of a plurality of networks of this type. The network operator 242 can then additionally use the information regarding the equivalent storage capacity for controlling the networks and allow it to be incorporated into their planning and can then fall back on corresponding support by way of the charging station. The data channel 241 can therefore be operated in both directions. The network operator 242 can thus also provide the charging station with set values via this data channel 241. This particularly includes a request for a service, such as providing a momentary reserve, primary control, positive or negative minute reserve or secondary control.

The underlying idea is therefore to provide a precharge functionality by way of a virtual storage device. In this case, controllable loads, shiftable loads, which can also be described as consumers in each case, and optionally real storage devices are summarized as a virtual precharged storage device.

A precharged storage device for e-mobility fast-charging stations can therefore be functionally achieved by the principle of the virtual storage device. The capacity of a small precharged storage device can be increased by combining controllable and shiftable loads to form a storage system with high availability which is large from a network perspective. A network-powered or network-supported operation in combination with a precharge operation can also be realized if an integrated, real storage device is present. A precharge operation without a real storage device can also be realized.

It has been taken into account and recognized that virtual storage devices act like real storage devices from a network perspective but can consist of controllable and shiftable loads. There can indeed be a correspondingly lower availability as a result but costs can be saved for a real precharged storage device, at least a precharged storage device can be dimensioned to be smaller.

By means of the proposed simple approach, a charging power can be significantly increased at short notice and a network expansion nevertheless avoided. As a result, more charging power can optionally be achieved at the same network connection costs. As a result, a faster network connection can optionally also be achieved.

System services can therefore also be provided at comparatively low costs.

It has been recognized that using the principle of a virtual storage device as a precharged storage device for increasing the charging power at short notice can be achieved particularly in a fast-charging station, wherein a real storage device can be dispensed with.

It is possible to provide an additional power, namely by means of a virtual storage device, a shift of consumption and/or controllable loads or consumers.

This can either be achieved directly at the charging point by means of vehicles which are already being charged if they can reduce their charging power. It can also be achieved by means of adjacent loads, such as a rest stop, ovens and refrigeration, for example, to name several examples. In this case, the charging power can be divided into a fixed and variable part. The variable part can be part of the virtual storage device.

A virtual storage device with an integrated, real storage device can also be used for system services and as a precharged storage device.

Availability of the virtual storage device is ensured by the real storage device. A reduction in the availability of a virtual storage device of this type as a precharged storage device, i.e., for charging the electric vehicles, in favor of system services is proposed as an advantageous variant.

The invention claimed is:

1. A charging station for charging electric vehicles, the charging station comprising:
   a network connection point for exchanging electrical power with an electrical supply network;
   at least one charging terminal, in each case for charging an electric vehicle; and
   a control device for controlling the charging station, wherein the control device is configured to:
   determine an equivalent storage capacity; and
   transmit the equivalent storage capacity to a receiver outside the charging station,
   wherein the equivalent storage capacity describes a value which corresponds to a storage capacity of an equivalent electrical storage device which can absorb and emit as much energy as the charging station can absorb and emit by changing its absorbed or emitted power for a predetermined support period,
   wherein the equivalent storage capacity specifies a storage capacity of a virtual precharged storage device and provides the receiver with information for planning a power or energy distribution.

2. The charging station as claimed in claim 1, wherein:
   the charging station has a transmission interface for transmitting the equivalent storage capacity to a receiver outside the charging station,
   the control device is configured to determine the equivalent storage capacity at least depending on at least one of:
   a charging situation of the at least one charging terminal;
   a current storage capacity of at least one electrical storage device of the charging station; or
   an operating point of at least one controllable consumer.

3. The charging station as claimed in claim 1, wherein the control device is configured to determine and transmit at least one of: a positive equivalent storage capacity or a negative equivalent storage capacity as the equivalent storage capacity, wherein:
   the positive equivalent storage capacity specifies an amount of energy that can additionally be fed into the electrical supply network or an amount of energy a withdrawal from the electrical supply network can be reduced, and
   the negative equivalent storage capacity specifies an amount of energy that can additionally be absorbed from the electrical supply network or an amount of energy a feed-in to the electrical supply network can be reduced.

4. The charging station as claimed in claim 1, wherein for determining the equivalent storage capacity, a current charging power with which one or a plurality of electric vehicles are charged is divided into:
   a minimum charging power which specifies a charging power, wherein the current charging power is configured to not fall below the charging power, and
   an available charging power by which the current charging power is configured to be reduced.

5. The charging station as claimed in claim 1, wherein the control device is configured to at least one of:
   receive a specification of an equivalent storage capacity externally from a network operator,
   control the charging station in such a way that a predetermined equivalent storage capacity is reached, or
   output information regarding which equivalent storage capacity is configured to be provided in the event the predetermined equivalent storage capacity cannot be reached.

6. The charging station as claimed in claim 1, wherein a period of a momentary reserve, primary control, secondary control, positive or negative minute reserve, or balancing group management is taken as a basis for a predetermined support period.

7. The charging station as claimed in claim 1, wherein a charging power curve is taken as a basis for determining the equivalent storage capacity.

8. The charging station as claimed in claim 1, wherein the control device is configured to determine an emergency storage capacity which specifies an increased amount which relates to an equivalent storage capacity, wherein the equivalent storage capacity arises if a minimum charging power is taken into account as the charging power which is to be taken into account if a reduction of the charging power to zero is also taken into account for determining the equivalent storage capacity, or even a reduction to a negative value, in the case of which power is withdrawn from at least one electric vehicle.

9. The charging station as claimed in claim 1, wherein depending on the determined equivalent storage capacity, a support power is provided to the electrical supply network, wherein a momentary reserve, a support power for a primary control, a support power for a secondary control, a support power for a positive or negative minute reserve, or a support power for balancing group management.

10. The charging station as claimed in claim 2, wherein the control device is configured to control at least one of the following:
    charging at least one electric vehicle to specify in each case at least one charge set value or an available charging power to the relevant charging terminals;
    storing or withdrawing electrical power of the at least one electrical storage device;
    exchanging electrical power via the network connection point; or
    driving of the at least one controllable consumer.

11. A method for charging electric vehicles by a charging station, the charging station comprising:
    a network connection point for exchanging electrical power with an electrical supply network;
    at least one charging terminal, in each case for charging an electric vehicle; and
    a control device for controlling the charging station, wherein the method comprises:
    determining an equivalent storage capacity; and
    transmitting the equivalent storage capacity to a receiver outside the charging station,
    wherein the equivalent storage capacity describes a value which corresponds to a storage capacity of an equivalent electrical storage device configured to absorb and emit as much energy as the charging station configured to absorb and emit by changing its absorbed or emitted power for a predetermined support period,
    wherein the equivalent storage capacity specifies a storage capacity of a virtual precharged storage device and provides the receiver with information for planning a power or energy distribution.

12. The method as claimed in claim 11, wherein determining the equivalent storage capacity is determined at least depending on:
    a charging situation of the at least one charging terminal; and
    a current storage capacity of at least one electrical storage device of the charging station.

13. The method as claimed in claim 11, wherein determining the equivalent storage capacity includes a current charging power with which one or a plurality of electric vehicles are charged is divided into:
    a minimum charging power which specifies a charging power which the current charging power does not fall below, and
    an available charging power by which the current charging power is reduced.

14. The method as claimed in claim 11, comprising:
    receiving a specification of a predetermined equivalent storage capacity from a network operator, and
    controlling the charging station in such a way that the predetermined equivalent storage capacity is reached, or outputting information regarding which equivalent storage capacity can be provided in the event the predetermined equivalent storage capacity cannot be reached.

15. The method as claimed in claim 14 wherein taking a period of a momentary reserve, primary control, positive or negative minute reserve or secondary control as a basis for a predetermined support period,
    wherein depending on the predetermined support period, a support power is provided to the electrical supply network, wherein the support power is one of a momentary reserve, primary control, positive or negative minute reserve or a secondary control,
    wherein a charging power curve which is known, expected, or forecasted is taken as a basis for determining the equivalent storage capacity,
    wherein an emergency storage capacity is determined, wherein the emergency storage capacity specifies a maximum equivalent storage capacity which relates to the equivalent storage capacity, wherein the equivalent storage capacity arises when a minimum charging power is also taken into account as the charging power, which is to be taken into account when a reduction of the charging power to zero is also taken into account for determining the equivalent storage capacity, or even a reduction to a negative value, in a case in which power is withdrawn from at least one electric vehicle,
    wherein depending on the equivalent storage capacity, the control device is configured to:
    charge the at least one electric vehicle, in each case at least one charge set value or an available charging power is specified to the relevant charging terminals,
    store or withdraw electrical power of at least one electrical storage device,
    exchange electrical power via the network connection point, and/or
    drive at least one controllable consumer.

16. The method as claimed in claim 13, wherein the determining the equivalent storage capacity includes the current charging power with which the one or the plurality of electric vehicles are charged is further divided into an additional charging power by which the current charging power is configured to be increased,
    wherein a positive equivalent storage capacity is determined depending on the minimum charging power, and
    wherein a negative equivalent storage capacity is determined depending on the additional charging power.

17. The method as claimed in claim 11, wherein the equivalent storage capacity is determined further depending on at least one of:
    an operating point of at least one controllable consumer; or
    determining and transmitting at least one of a positive equivalent storage capacity or a negative equivalent storage capacity,
    wherein the positive equivalent storage capacity specifies an amount of energy that can additionally be fed into the electrical supply network or an amount of energy a withdrawal from the electrical supply network can be reduced, and
    the negative equivalent storage capacity specifies an amount of energy that can additionally be absorbed from the electrical supply network or an amount of energy a feed-in to the electrical supply network can be reduced.

18. The charging station as claimed in claim 4, wherein the control device is configured to determine an additional charging power by which the current charging power is increased, a positive equivalent storage capacity depending on the minimum charging power, and a negative equivalent storage capacity depending on the additional charging power.

19. The charging station as claimed in claim 2, wherein the receiver outside the charging station is a data terminal, a cable connection to the receiver, or a transmitting and receiving unit for operating a wireless connection to the receiver.

20. A method for charging electric vehicles by a charging station, the charging station comprising:
- a network connection point for exchanging electrical power with an electrical supply network;
- at least one charging terminal, in each case for charging an electric vehicle; and
- a control device for controlling the charging station, wherein the method comprises:
determining an equivalent storage capacity;
transmitting the equivalent storage capacity to a receiver outside the charging station,
wherein the equivalent storage capacity describes a value which corresponds to a storage capacity of an equivalent electrical storage device configured to absorb or emit as much energy as the charging station configured to absorb or emit by changing its absorbed or emitted power for a predetermined support period,
receiving a specification of a predetermined equivalent storage capacity from a network operator, and
controlling the charging station in such a way that the predetermined equivalent storage capacity is reached, or outputting information regarding which equivalent storage capacity can be provided in the event the predetermined equivalent storage capacity cannot be reached,
wherein taking a period of a momentary reserve, primary control, positive or negative minute reserve or secondary control as a basis for a predetermined support period,
wherein depending on the predetermined support period, a support power is provided to the electrical supply network, wherein the support power is one of a momentary reserve, primary control, positive or negative minute reserve or a secondary control,
wherein a charging power curve, which is known, expected, or forecasted, is taken as a basis for determining the equivalent storage capacity,
wherein an emergency storage capacity is determined, wherein the emergency storage capacity specifies a maximum equivalent storage capacity which relates to the equivalent storage capacity, wherein the equivalent storage capacity arises when a minimum charging power is also taken into account as the charging power, which is to be taken into account when a reduction of the charging power to zero is also taken into account for determining the equivalent storage capacity, or even a reduction to a negative value, in a case in which power is withdrawn from the electric vehicle, and
wherein depending on the equivalent storage capacity, the control device is configured to:
- charge the electric vehicle, in each case at least one charge set value or an available charging power is specified to the relevant charging terminals,
- store or withdraw electrical power of at least one electrical storage device,
- exchange electrical power via the network connection point, and/or
- drive at least one controllable consumer.

* * * * *